(12) United States Patent
Wang et al.

(10) Patent No.: US 8,346,541 B2
(45) Date of Patent: Jan. 1, 2013

(54) METHOD FOR CONSTRUCTING CHINESE DICTIONARY AND APPARATUS AND STORAGE MEDIA USING THE SAME

(75) Inventors: Wen-Nan Wang, Taichung County (TW); Jason S. Chang, Hsinchu (TW); Wen-Tai Hsieh, Taipei (TW); Tsun Ku, Taipei (TW); Chien-Cheng Wu, Yunlin County (TW); Yu-Ru Chen, Taipei County (TW)

(73) Assignee: Institute for Information Industry, Taipei (TW)

( * ) Notice: Subject to any disclaimer, the term of this patent is extended or adjusted under 35 U.S.C. 154(b) by 833 days.

(21) Appl. No.: 12/475,665

(22) Filed: Jun. 1, 2009

(65) Prior Publication Data

US 2010/0138217 A1   Jun. 3, 2010

(30) Foreign Application Priority Data

Nov. 28, 2008  (TW) ............................... 97146196 A (51) Int. Cl.
*G06F 17/20* (2006.01)
*G06F 17/21* (2006.01)
*G06F 17/30* (2006.01)
*G06F 17/28* (2006.01)

(52) U.S. Cl. ............ 704/10; 704/4; 704/7; 704/9; 704/1
(58) Field of Classification Search .................. 704/1–9, 704/10, E1.001–E11.007; 707/736–757
See application file for complete search history.

(56) References Cited

U.S. PATENT DOCUMENTS

| | | | | |
|---|---|---|---|---|
| 5,251,129 | A * | 10/1993 | Jacobs et al. ...................... 704/9 |
| 5,418,717 | A * | 5/1995 | Su et al. ............................. 704/9 |
| 5,619,709 | A * | 4/1997 | Caid et al. ..................... 715/209 |
| 5,715,468 | A * | 2/1998 | Budzinski ......................... 704/9 |
| 6,405,161 | B1 * | 6/2002 | Goldsmith ........................ 704/9 |
| 7,031,911 | B2 * | 4/2006 | Zhou et al. ..................... 704/10 |
| 7,191,115 | B2 * | 3/2007 | Moore ............................. 704/2 |
| 7,249,012 | B2 * | 7/2007 | Moore ............................. 704/4 |
| 7,356,457 | B2 * | 4/2008 | Pinkham et al. .................. 704/2 |
| 7,398,199 | B2 * | 7/2008 | Gong ............................... 704/8 |
| 7,430,504 | B2 * | 9/2008 | Vanderwende et al. .......... 704/9 |

(Continued)

OTHER PUBLICATIONS

Xue, Nianwen. "Labeling Chinese predicates with semantic roles." MIT Press: Cambridge, MA. Journal of Computational Linguistics, vol. 43, #2: Jun. 2008. pp. 225-255.*

*Primary Examiner* — Pierre-Louis Desir
*Assistant Examiner* — David Kovacek
(74) *Attorney, Agent, or Firm* — McClure, Qualey & Rodack, LLP (57) ABSTRACT

A method for constructing a Chinese dictionary is disclosed, including determining a probability for nominalization of a Chinese term with a given collocation term according to a determination rule and the correlation between the Chinese term and its corresponding collocations, wherein the Chinese term is determined to be a verb part-of-speech. The method further includes modifying the verb part-of-speech of the Chinese term with the given collocation term to an appropriate part-of-speech when the probability for nominalization of the Chinese term with the given collocation term is higher than a predetermined value, and storing the correlation between the Chinese term, the given collocation term and the appropriate part-of-speech in a storage device.

20 Claims, 3 Drawing Sheets

U.S. PATENT DOCUMENTS

| | | | |
|---|---|---|---|
| 7,555,428 B1 * | 6/2009 | Franz et al. | 704/10 |
| 7,774,193 B2 * | 8/2010 | Gao et al. | 704/4 |
| 8,014,996 B1 * | 9/2011 | Kinder | 704/1 |
| 2002/0064285 A1 * | 5/2002 | DeLeon | 381/56 |
| 2002/0128821 A1 * | 9/2002 | Ehsani et al. | 704/10 |
| 2004/0059564 A1 * | 3/2004 | Zhou | 704/4 |
| 2004/0172566 A1 * | 9/2004 | Greiger et al. | 713/320 |
| 2005/0125215 A1 * | 6/2005 | Wu et al. | 704/1 |
| 2005/0288920 A1 * | 12/2005 | Green et al. | 704/3 |
| 2006/0282255 A1 * | 12/2006 | Lu et al. | 704/2 |
| 2007/0010992 A1 * | 1/2007 | Hon et al. | 704/9 |
| 2007/0016397 A1 * | 1/2007 | Lu et al. | 704/2 |
| 2008/0091405 A1 * | 4/2008 | Anisimovich et al. | 704/4 |
| 2010/0063798 A1 * | 3/2010 | Ku et al. | 704/9 |
| 2010/0138217 A1 * | 6/2010 | Wang et al. | 704/10 |

* cited by examiner

METHOD FOR CONSTRUCTING CHINESE DICTIONARY AND APPARATUS AND STORAGE MEDIA USING THE SAME

This Application claims priority of Taiwan Patent Application No. 97146196, filed on Nov. 28, 2008, the entirety of which is incorporated by reference herein.

BACKGROUND OF THE INVENTION

1. Field of the Invention

The invention relates generally to a method for constructing a Chinese dictionary and apparatus and storage media using the same, and more particularly, to a method for constructing a Chinese dictionary and apparatus and storage media using the same, wherein a Chinese collocation is provided for a Chinese term according to a probability for nominalization of the Chinese term.

2. Description of the Related Art

As the increasing prevalence of the internet, one not only can obtain the desired information from the traditional books, but also from the internet For many Chinese learners, on-line Chinese dictionaries or electronic dictionaries have been the important tools for learning Chinese. In light of this, constructing an on-line Chinese dictionary or an electronic dictionary which provides complete teaching functions has become an important issue.

For a querying operation of an on-line Chinese dictionary located via the internet or an electronic dictionary, a user typically enters a Chinese term, and in response, the Chinese dictionary lists, in addition to the definition (assumed from herefouth), the possible parts-of-speech and corresponding collocations of the queried Chinese term for reference and learning. As an example, when a user's query is the Chinese term "xue xi (學習)", the Chinese dictionary will list all the possible parts-of-speech, such as verb, noun, adjective and so on, and corresponding collocations of the queried Chinese term "xue xi (學習)". Chinese example sentences including the queried Chinese term and corresponding collocations for each part-of-speech respectively would be listed. In the case of the queried Chinese term "xue xi (學習)" being used as a verb part-of-speech, a conventional Chinese dictionary would list "ta "xue xi" zhong wen (他"學習"中文)" as a Chinese example sentence. Here, corresponding collocations would include a pre-term subject "ta (他)" and a post-term object "zhong wen (中文)", respectively inserted preceding and following the queried Chinese term "xue xi (學習)". A similar process would be performed for listing a Chinese example sentence using "xue xi (學習)" as a noun part-of-speech.

One method for constructing a Chinese dictionary is provided by the Chinese Word Sketch Engine disclosed by the Academia Sinica of Taiwan. The Chinese Word Sketch Engine determines Chinese collocations according to English grammar, and constructs a Chinese dictionary based on the Chinese collocations. However, the Chinese Word Sketch Engine does not take into account part-of-speech differences between English and Chinese. As such, erroneous determinations may be provided. Following are 3 Chinese example sentences provided by the Chinese Word Sketch Engine, following query of the Chinese term "xue xi (學習)".

TABLE 1

Chinese Word Sketch Engine of the Academia Sinica of Taiwan

| xue xi (學習)(VC) + Objective | Chinese Example Sentence |
|---|---|
| huan jing (環境) | ... rang xue sheng jin bu de ying yu xue xi "huan jing" (讓學生進步的英語學習"環境")... |
| ma lie zhu yi (馬列主義) | ... ta zhi chu (他指出), jun dui yao ren zhen xue xi "ma lie zhu yi"(軍隊要認真學習"馬列主義")... |
| zhong wen (中文) | ... wo zheng zai xue xi "zhong wen" (我正在學習"中文")... |

As shown in Table 1, only 2 of the 3 example sentences are appropriate example sentences of the Chinese term "xue xi (學習)" being used as a verb. In Table 1, for the second and third example sentences, the Chinese Word Sketch Engine provided the appropriate respective post-term Chinese collocations "ma lie zhu yi (馬列主義)" and "zhong wen (中文)". However, for the first example sentence, an erroneous part-of-speech determination of the Chinese term "xue xi (學習)" occurred. In the first example sentence, the Chinese term "xue xi (學習)" with the post-term Chinese collocations "huan jing (環境)" should be as a noun and not as a verb, although the post-term "huan jing (環境)" is a noun. It is the nominalization for the Chinese term "xue xi (學習)", and the erroneous part-of-speech determination is due to lack of nominalization determination of the Chinese Word Sketch Engine.

Another known method for constructing a Chinese dictionary utilizes the Smadja Xtract system. The Smadja Xtract system for constructing a Chinese dictionary determines Chinese collocations according to statistics. However, nominalization determination is also not provided by the system, thus, erroneous Chinese example sentences may be provided.

BRIEF SUMMARY OF THE INVENTION

The invention discloses an apparatus for constructing a Chinese dictionary, comprising a nominalization determination module and a part-of-speech modification module. The nominalization determination module determines a probability for nominalization of a Chinese term with a given collocation term according to a determination rule and the correlation between the Chinese term and its corresponding collocations, wherein the Chinese term is determined to be a verb part-of-speech. The part-of-speech modification module modifies the verb part-of-speech of the Chinese term with the given collocation term to an appropriate part-of-speech when the probability for nominalization of the Chinese term with the given collocation term is higher than a predetermined value.

Furthermore, the invention discloses a method for constructing a Chinese dictionary. The method comprises determining a probability for nominalization of a Chinese term with a given collocation term according to a determination rule and the correlation between the Chinese term and its corresponding collocations, wherein the Chinese term is determined to be a verb part-of-speech. The method further comprises modifying the verb part-of-speech of the Chinese term with the given collocation term to an appropriate part-of-speech when the probability for nominalization of the Chinese term with the given collocation term is higher than a predetermined value, and storing the correlation between the Chinese term, the given collocation term and the appropriate part-of-speech in a storage device.

Furthermore, the invention discloses a storage medium for storing a program for constructing a Chinese dictionary. The program for constructing the Chinese dictionary comprises a plurality of program codes to be loaded onto a computer system so that a method for constructing the Chinese dictionary is executed by the computer system. The method comprises determining a probability for nominalization of a Chinese term with a given collocation term according to a determination rule and the correlation between the Chinese term and its corresponding collocations, wherein the Chinese term is determined to be a verb part-of-speech. The method further comprises modifying the verb part-of-speech of the Chinese term with the given collocation term to an appropriate part-of-speech when the probability for nominalization of the Chinese term the given collocation term is higher than a predetermined value, and storing the correlation between the Chinese term, the given collocation term and the appropriate part-of-speech in a storage device.

BRIEF DESCRIPTION OF THE DRAWINGS

For fully understanding the of the purpose, the features, and the advantage of the invention, preferred embodiments of the invention are illustrated in the accompanying drawings and described in detail with reference to the following description. In the drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
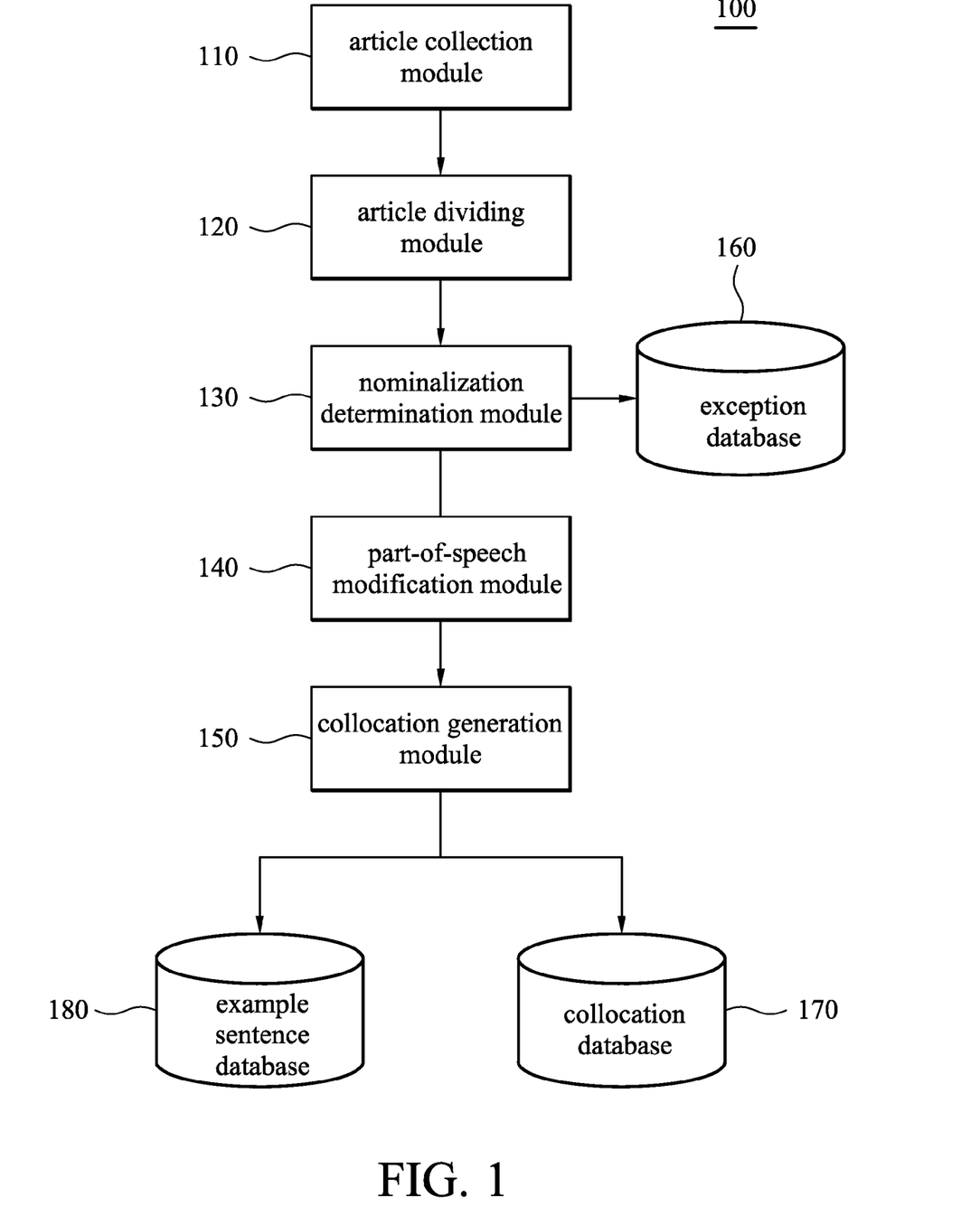
FIG. 1 depicts a diagram of an apparatus for constructing a Chinese dictionary according to an embodiment of the invention.

FIG. 1 depicts a diagram of an apparatus for constructing a Chinese dictionary according to an embodiment of the invention. The apparatus 100 for constructing a Chinese dictionary comprises an article collection module 110, an article dividing module 120, a nominalization determination module 130, a part-of-speech modification module 140, a collocation generation module 150, an exception database 160, a collocation database 170 and an example sentence database 180. Operation of the embodiment of the apparatus 100 for constructing a Chinese dictionary is described in detail below.

Figure 2:
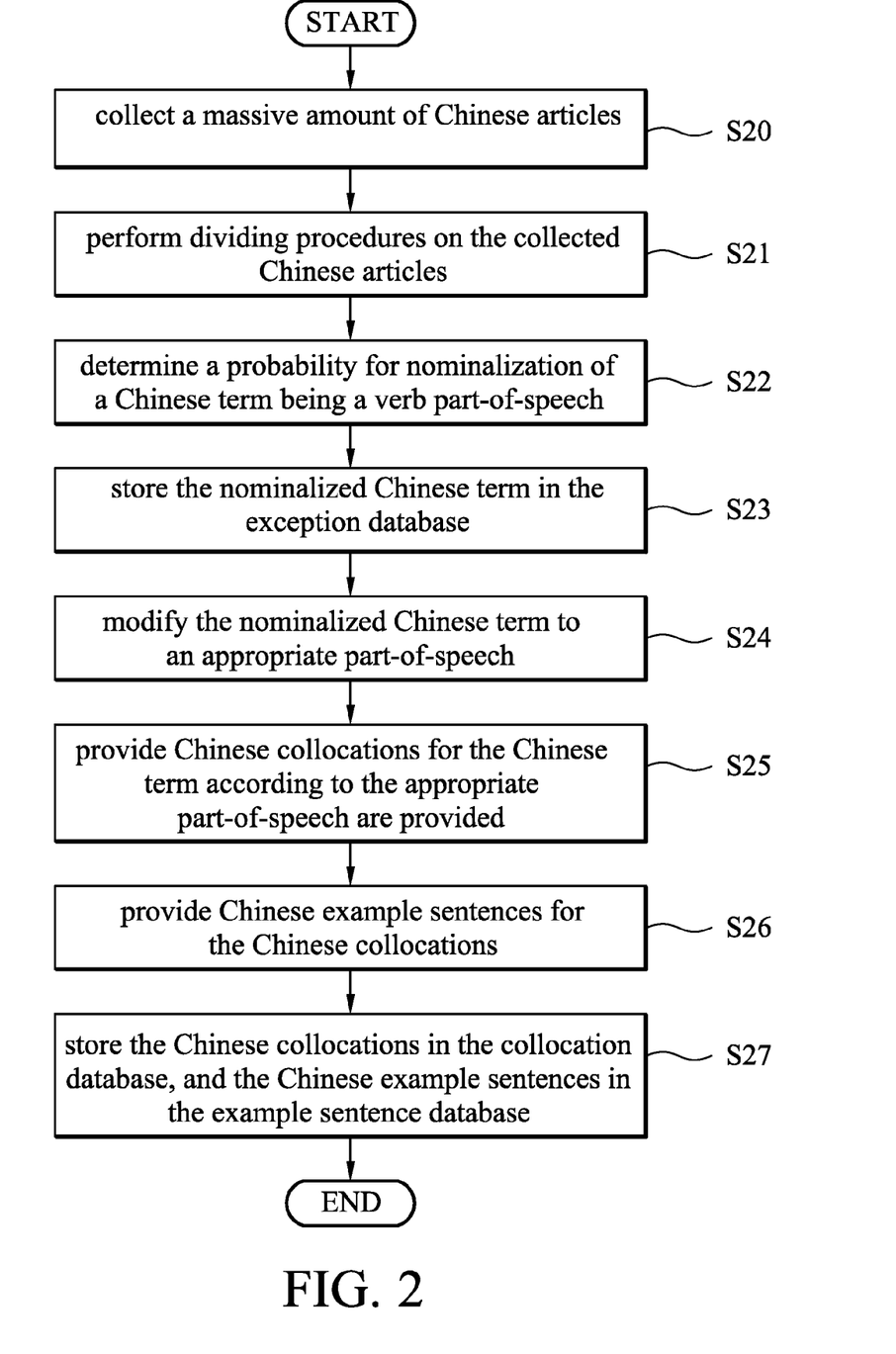
FIG. 2 depicts an operation flowchart of an apparatus for constructing a Chinese dictionary according to an embodiment of the invention.

FIG. 2 depicts an operation flowchart of an apparatus for constructing a Chinese dictionary according to an embodiment of the invention. It is to be emphasized that the invention requires a massive amount of Chinese articles in order to determine appropriate Chinese collocations of a Chinese term therefrom. Therefore, at the beginning, the article collection module 110 collects a massive amount of Chinese articles (step S20). The Chinese articles may be collected from sources such as the Chinese Gigaword Corpus, but is not limited thereto. After collection of the Chinese articles, the article dividing module 120 performs dividing procedures on the collected Chinese articles (step S21), in order to determine suitable Chinese collocations of a Chinese term being a verb part-of-speech based on the divided Chinese articles. Note that the invention aim at the nominalization of a Chinese term which is used as a verb part-of-speech, not other part-of-speech. Next, as described previously, a probability for nominalization of a Chinese term being a verb part-of-speech is required to be firstly determined before determining the Chinese collocations for the Chinese term. Therefore, the nominalization determination module 130 determines a probability for nominalization of a Chinese term being a verb part-of-speech (step S22). Note that the invention only discusses the nominalization of a Chinese term being a verb part-of-speech, and not nominalization of any Chinese term being the other part-of-speech. Also note that the nominalization determination module 130 performs the nominalization determination according to a determination rule, such as a maximum entropy method, a support vector machine, a hidden Markov model, a classifier, the other statistics method, and so on. The preferred embodiment is illustrated with the maximum entropy method as follows.

Before describing determination of the probability for nominalization of a Chinese term being a verb part-of-speech, please note the following. As described in step S21 of FIG. 2, the article dividing module 120 divides each of the collected Chinese articles to produce a plurality of Chinese terms. Specifically, all punctuation marks from each of the collected Chinese articles are removed to produce a plurality of Chinese sentences, and then the plurality of Chinese sentences is divided into a plurality of Chinese terms. In addition, the probability for nominalization of a Chinese term being a verb part-of-speech is based on the plurality of Chinese sentences.

In this embodiment, the Chinese term "xue xi (學習)" as a verb part-of-speech is used as an example to determine the probability for nominalization of a Chinese term. Thus, all Chinese sentences with the Chinese term "xue xi (學習)" are selected from the Chinese sentences. Next, a portion of data from the selected Chinese sentences is extracted for parameter training, and the trained parameters are used to determine the parameters of other portions of data from the selected Chinese sentences to determine the probability for nominalization of the Chinese term "xue xi (學習)" being a verb part-of-speech. For example, if there are 500 selected Chinese sentences with the Chinese verb part-of-speech "xue xi (學習)", then 100 selected Chinese sentences out of the 500 selected Chinese sentences may be extracted for parameter training. Thus, the trained parameters are used to determine the parameters of the other 400 selected Chinese sentences to determine the probability for nominalization of the Chinese term "xue xi (學習)" being a verb part-of-speech.

For example, assume that the 100 selected Chinese sentences comprise Chinese sentences such as "wo zheng zai "xue xi" zhong wen (我正在"學習"中文)" and "zhe ke cheng ti gong neng rang xue sheng jin bu de "xue xi" huan jing (這課程提供能讓 學生進 步的"學習"環境)" etc. Next, the invention would obtain six characteristic values from each of the selected Chinese sentences. The six characteristic values may be values such as the Chinese term, the Chinese pre-term immediately preceding the Chinese term and the Chinese post-term immediately following the Chinese term, as well as values such as a determined part-of-speech for the Chinese pre-term, another determined part-of-speech for the Chinese post-term and the verb part-of-speech of the Chinese term. For example, three characteristic values for the Chinese sentence "wo zheng zai "xue xi" zhong wen (我正在"學習"中文)", may be defined as the Chinese term "xue xi (學習)", the Chinese pre-term "zheng zai (正在)" immediately preceding the Chinese term, and the Chinese post-term "zhong wen (中文)" immediately following the Chinese term. In addition, another three characteristic values for the Chinese sentence "wo zheng zai "xue xi" zhong wen (我正在" 學習"中文)", may be defined as the verb part-of-speech "VC", a determined part-of-speech for the Chinese pre-term "zheng zai (正在)", which is "D", and another determined part-of-speech for the Chinese post-term "zhong wen (學習)", which is "Na". Note that for more detailed description concerning part-of-speech related to the Chinese language please refer to PERIODCATEGORY developed by the Academia Sinica of Taiwan in which the above three parts-of-speech "VC", "D" and "Na" are defined and listed. Based on the above assumptions, six characteristic values may be obtained for the each of the selected Chinese sentences with the Chinese term "xue xi (學習)". Following, the six characteristic values are assigned corresponding weighted and return values. The characteristic values and their corresponding weighted and return values for the 100 selected Chinese sentences are shown in Table 2 below:

TABLE 2

List of Characteristic Values and Their Corresponding Weighted and Return Values

| number | Definition | weighted value ($\lambda_i$) | return value |
|---|---|---|---|
| f1 | determined part-of-speech for the Chinese pre-term = "D" | TBD | TBD |
| f2 | Chinese pre-term = "zheng zai (正在)" | TBD | TBD |
| f196 | determined part-of-speech for the Chinese pre-term = "DE" | TBD | TBD |
| f197 | Chinese pre-term = "de(的)" | TBD | TBD |
| f198 | Chinese term = "xue xi(學習)" | TBD | TBD |
| f199 | verb part-of-speech = "VC" | TBD | TBD |
| f200 | Chinese post-term = "huan jing (環境)" | TBD | TBD |
| f201 | determined part-of-speech for the Chinese post-term = "Na" | TBD | TBD |

In Table 2, TBD means to be determined, and all weighted and return values are initially not obtained, as, before determining the weighted and return values of the characteristic values, the weighted value of the Chinese term "xue xi (學習)" (namely, the probability for nominalization of the Chinese term "xue xi (學習)" being a verb part-of-speech) must be first determined. The determination of the probability for nominalization of the Chinese term being a verb part-of-speech requires manual determination of the 100 selected Chinese sentences. If the Chinese term "xue xi (學習)" is found to have been nominalized in 81 out of the 100 selected Chinese sentences, then the nominalized percent of the Chinese term "xue xi (學習)" for the 100 selected Chinese sentences would be 0.81. Note that the nominalized percent is not the probability for nominalization of the Chinese verb part-of-speech "xue xi (學習)", and is simply utilized, along with the maximum entropy method, to determine the weighted and return values for the characteristic values in Table 2.

Table 3 is the status of return values under parameter training. In Table 3, the six characteristic values of "de (的)", "DE", "xue xi (學習)", "VC", "huan (環境)" and "Na" of the Chinese sentence "zhe ke cheng ti gong neng rang xue sheng jin bu de "xue xi" huan jing (這課程提供能讓學生進步的"學 習"環境)" are used as examples. Thus, because the six weighted values of the six characteristic values are to be determined, the six corresponding return values are temporarily set as 1 and return values of other characteristic values are temporarily set as 0.

TABLE 3

The Status of Return Values Under Parameter Training

| number | Definition | weighted value ($\lambda_i$) | return value |
|---|---|---|---|
| f1 | determined part-of-speech for the Chinese pre-term = "D" | TBD | 0 |
| f2 | Chinese pre-term = "zheng zai (正在)" | TBD | 0 |
| f196 | determined part-of-speech for the Chinese pre-term = "DE" | TBD | 1 |
| f197 | Chinese pre-term = "de(的)" | TBD | 1 |
| f198 | Chinese term = "xue xi(學習)" | 0.81 | 1 |
| f199 | verb part-of-speech = "VC" | TBD | 1 |
| f200 | Chinese post-term = "huan jing(環境)" | TBD | 1 |
| f201 | determined part-of-speech for the Chinese post-term = "Na" | TBD | 1 |

Next, Formulas provided by the maximum entropy method are used to calculate the weighted values for f196 to f201, except for f198, which was already manually determined. Formula (A) and Formula (B) is as follows:

$$\sum_{i=1}^{n} Pr(X_i \mid I) f_k(x_i) = F_k \quad (A)$$

$$k = 1, \ldots, m; \text{ and}$$

$$F_k = \frac{\partial}{\partial \lambda_k} \log Z(\lambda_1, \lambda_2, \ldots, \lambda_m), \quad (B)$$

wherein each function is defined as:

$Pr(X_i|I)$: probability for nominalization of a Chinese term being a verb part-of-speech;

$f_k(x_i)$: return value of a characteristic value; and $F_k$: characteristic function of a specific characteristic value, which is determined by the weighted values of the individual characteristic values.

Thus, when applying the Chinese pre-term "de (的)" to Formula (A) and Formula (B), as an example, the weighted value of the Chinese pre-term "de (的)" is 0.72. As such, it is determined that 72% of the Chinese term "xue xi (學習)" following the Chinese pre-term "de (的)" are nominalized. Note that all weighted values in Table 2 are calculated.

Thus, when applying the pre-term "de (的)" to Formula (A) and Formula (B), as an example, the weighted value of the pre-term "de (的)" is 0.72. As such, it is determined that 72% of the Chinese verb part-of-speech "xue xi (學習)" following the pre-term "de (的)" are nominalized. Note that all weighted values in Table 2 are calculated.

TABLE 4

The Trained Weighted Values

| number | Definition | weighted value ($\lambda_i$) | return value |
|---|---|---|---|
| f196 | determined part-of-speech for the Chinese pre-term = "DE" | 0.62 | 1 |
| f197 | Chinese pre-term = "de(的)" | 0.72 | 1 |
| f198 | Chinese term = "xue xi(學習)" | 0.81 | 1 |
| f199 | verb part-of-speech = "VC" | 0.65 | 1 |
| f200 | Chinese post-term = "huan jing (環境)" | 0.5 | 0 |

TABLE 4-continued

The Trained Weighted Values

| number | Definition | weighted value ($\lambda_i$) | return value |
|---|---|---|---|
| f201 | determined part-of-speech for the Chinese post-term = "Na" | 0.5 | 0 |

$$Pr(x_i \mid I) = \frac{1}{Z(\lambda_1, \ldots, \lambda_m)} \exp[\lambda_1 f_1(x_i) + \ldots + \lambda_m f_m(x_i)]$$

Next, the trained weighted value and return value results are added into the equation above which determines the probability for nominalization of the Chinese term "xue xi (學習)", and the result is shown below.

$$P = \frac{1}{Z} \exp[0.452*1 + 0.023*0 + 0.371*1 + \ldots + 0.002*1] = 0.962$$

As shown, the probability for nominalization of the Chinese term "xue xi (學習)" is 0.962. Thus, since 0.962 is greater than the predetermined value, 0.5, for example, the Chinese verb part-of-speech is considered to be nominalized. Note the predetermined value of 0.5 is merely an empirical value, and may be any other predetermined value.

Following, the nominalized Chinese term is stored in the exception database 160 (step S23) so that nominalization determination will not be required to be performed again.

Next, the part-of-speech modification module 140 modifies the nominalized Chinese term to an appropriate part-of-speech (step S24). For example, the nominalized Chinese term "xue xi (學習)" is modified from a Chinese verb part-of-speech "VC" to a Chinese noun part-of-speech "Nc". Thus, due to the method for constructing a Chinese dictionary according to embodiments of the invention, appropriate Chinese parts-of-speech are determined. Following, Chinese collocations for the Chinese term according to the appropriate part-of-speech are provided for additional language teaching functions (step S25).

As described previously, the invention selects all Chinese sentences with the Chinese term "xue xi (學習)", and finds out the related Chinese collocations for the Chinese term "xue xi (學習)" from the selected Chinese sentences. The selection of Chinese collocations is dependent upon two factors: the strength of the Chinese collocations with respect to the Chinese term "xue xi (學習)", and the location of the Chinese collocations with respect to the Chinese term "xue xi (學習)". The strength of the collocations refer to the number of times that the Chinese term "xue xi (學習)" and the Chinese collocation both appear in an observation window. The location of the Chinese collocations refers to the number of Chinese characters located between the Chinese term "xue xi (學習)" and the Chinese collocation in the observation window. The observation window may either be a whole Chinese sentence or a portion of the Chinese sentence (a limited number of characters).

The formula for strength of a Chinese collocation is as follows:

$$k_i = \frac{freq_i - \bar{f}}{\sigma},$$

wherein each variable is defined as:

$freq_i$: the number of times that a Chinese term and the Chinese collocation both appear in an observation window;

$\bar{f}$: the average of all $freq_i$; and $\sigma$: standard deviation,

The formula for location of a Chinese collocation (using an observation window of 10 Chinese characters as an example) is as follows:

$$U_j = \frac{\sum_{j=1}^{10} (P_i^j - \bar{p}_i)^2}{10},$$

The variable j represents the number of Chinese terms located between a Chinese term "xue xi (學習)" and the Chinese collocation. Note that a Chinese term may not necessarily consist of only one Chinese character. For example, the Chinese term "xue xi (學習)" consists of two Chinese characters. In this regard, if the number of Chinese terms located between a Chinese term "xue xi (學習)" and the Chinese collocation is 5, there are at least 5 Chinese characters located between the Chinese term "xue xi (學習)" and the Chinese collocation. In addition, the $P_i^j$ is the number of times the Chinese collocation appears in a location which is j number of Chinese terms away from the Chinese term "xue xi (學習)". For example, if the variable j is 1, it indicates that there is 0 Chinese term located between a Chinese term "xue xi (學習)" and the Chinese collocation. In above description, the variable j being 1 means no Chinese term is located between a Chinese term "xue xi (學習)" and the Chinese collocation. Similarly, the variable j being 3 means 2 Chinese terms are located between a Chinese term "xue xi (學習)" and the Chinese collocation. In addition, $\bar{p}_i$ represents the average of all $P_i^j$'s.

Based on the calculation result of $k_i$ and $U_j$, a Chinese collocation may be determined as only being appropriate if the calculated $k_i$ is higher than an empirical threshold of 0.7, and the calculated $U_j$ is higher than an empirical threshold of 12. Note that the empirical thresholds are non-limiting. Table 5 is an exemplary Chinese collocation list. Note the Chinese term appeared in the exemplary Chinese collocation list of Table 5 is not limited to the "xue xi (學習)" described above, but with "lian meng (聯盟)" included also. In fact, the Chinese term in a real implementation may cover a variety of Chinese characters, as the Chinese characters "xue xi (學習)" and "lian meng (聯盟)" are merely used as an example for illustration of the invention.

TABLE 5

An Exemplary Chinese Collocation List

| Chinese Term | Chinese Collocation | Number of Times Appearing | Distance (Between The Chinese Term And The Chinese Collocation) | Strength | Scattering |
|---|---|---|---|---|---|
| lian meng (聯盟) | yu qing (籲請) | 238 | 0 | 0.98 | 2.52 |
| xue xi (學習)-1 | huan jing (環境)-1 | 1114 | 0 | 2.73 | 23.7 |
| xue x (學習)-2 | huan jing (環境)-2 | 690 | 1 | 0.32 | 18.1 |
| xue xi (學習)-3 | huan jing (環境)-3 | 532 | 2 | 1.24 | 13.2 |
| xue xi (學習) | zhong wen (中文) | 231 | 0 | 4.21 | 28.1 |

In Table 5, the distance represents the number of Chinese terms located between a Chinese term and a Chinese collocation. For example, the distance of the Chinese term "lian meng (聯盟)" being 0 would suggest that there is no Chinese term located between the Chinese term "lian meng (聯盟)" and the Chinese collocation "yu qing (籲請)" As such, a combination of the Chinese term "lian meng (聯盟)" and the collocation "yu qing (籲請)" would read: "er tong fu li "lian meng" "yu qing" lao shi bu yao ti fa xue tong (兒童福利"聯盟""籲請"老師不要 體罰學童)". In the above Chinese example sentence, the Chinese term "lian meng (聯盟)" appears together with its Chinese collocation "yu qing (聯盟)" without any Chinese term located between them. Here is another example, the distance of the Chinese term "xue xi (學習) -3" being 2 would suggest that 2 Chinese terms are located between the Chinese term "xue xi (學習) -3" and the Chinese collocation "huan jing (環境) -3". As such, a combination of the Chinese term "xue xi (學習) -3" and the collocation "huan jing (環境) -3" would read: "zhe xue xiao ti gong xue sheng yi ge "xue xi" ying yu de "huan jing" (這學校提供學生一個"學習"英語 的"環境")". In the above Chinese example sentence, the Chinese term "xue xi (學習) -3" appears together with its Chinese collocation "huan jing (環境) -3" with two Chinese terms "ying yu (英語)" and "de (的)" located between them. In addition, the Chinese collocation "yu qing (籲請)" appears with the Chinese term "lian meng (聯盟)" 238 times. However, the scattering result of 2.52 is less than the empirical threshold of 12. Thus, the Chinese collocation "yu qing (籲請)" will not be stored in the collocation database 170. Additionally, three Chinese collocations "huan jing (環境)" appear with the same Chinese term "xue xi (學習)", i.e. "huan jing (環境) -1" with respect to the Chinese term "xue xi (學習) -1", "huan jing (環境) -2" with respect to the Chinese term "xue xi (學習) -2" and "huan jing (環境) -3" with respect to the Chinese term "xue xi (學習) -3". the Chinese collocation "huan jing (環境) -2" appears with the Chinese term "xue xi (學習) -2" 690 times and the scattering result of 18.1 is greater than the empirical threshold of 12. However, the strength result of 0.32 is less than the empirical threshold of 0.70. Thus, the Chinese collocation "huan jing (環境) -2" will not be stored in the collocation database 170. Given the results in Table 5, only 3 of the shown example Chinese collocations match the defined criteria, "huan jing (環境) -2", "huan jing (環境) -3", and "zhong wen (中文)". Next, Chinese example sentences are provided for the Chinese collocations (step S26). For example, for the Chinese term "xue xi (學習)" and the Chinese collocation "zhong wen (中文)", an example sentence such as "fu qi liang shi feng mu qin zhi yu, fen bie yan shi "xue xi" "zhong wen" (夫妻倆侍奉母親 之餘, 分別延師"學習""中文")" may be provided. Thus, the Chinese collocation "zhong wen (中文)" is stored in the collocation database 170, and an example sentence such as "fu qi liang shi feng mu qin zhi yu, fen bie yan shi "xue xi" "zhong wen" (夫妻倆侍奉母親 之餘, 分別延師 "學習" "中文")" is stored in the example sentence database 180 for the Chinese term "xue xi (學習)" (step S27).

Following is a combined list of Chinese verb part-of-speech and Chinese collocations.

TABLE 6

A Combined List of Chinese verb part-of-speech and Chinese Collocations

| Chinese Term | Part-of-speech of Chinese Term | Chinese Collocation | Part-of-speech of Chinese Collocation | Collocation Distance |
|---|---|---|---|---|
| xue xi (學習) | VC | huan jing (環境) | Na | 1 |
| zhu ban (主辦) | VC | dan wei (單位) | Na | 1 |
| diao cha (調查) | VE | jin xing (進行) | VC | −1 |
| qing jie (清潔) | VH | wei chi (維持) | VJ | −1 |

Referring to Table 6, the collocation distance represents the number of Chinese terms that a Chinese collocation is located away from its corresponding Chinese term. A positive valued collocation distance means that the Chinese collocation follows the Chinese term in a Chinese sentence. A negative valued collocation distance means that the Chinese collocation precedes the Chinese term in a Chinese sentence. For example, the distance of the Chinese collocation "dan wei (單位)" being 1 would suggest that the Chinese collocation "dan wei (單位)" is located one Chinese term away following its Chinese term "zhu ban (主辦)". As such, a combination of the Chinese term "zhu ban (主辦)" and the collocation "dan wei (單位)" would read: "zi ce hui shi zhe ci zi xun jiang xi de "zhu ban" "dan wei" (資策會是這次資 訊講習的"主辦" "單位")". In the above Chinese example sentence, the Chinese collocation "dan wei (單位)" is the next Chinese term (located one Chinese term away) following its Chinese term "zhu ban (主辦)". Here is another example, the distance of the Chinese collocation "jin xing (進行)" being −1 would suggest that the Chinese collocation "jin xing (進行)" is located one Chinese term away preceding its Chinese term "diao cha (調查)". As such, a combination of the Chinese term "diao cha (調 查)" and the collocation "jin xing (進行)" would read: "jing fang jue ding dui zhe jian xuan an chong xin "jin xing" (警方決定對這件 懸案重新"進行 ""調查")". In the above Chinese example sentence, the Chinese collocation "jin xing (進行)" is the next Chinese term (located one Chinese term away) preceding its Chinese term "diao cha (調查 )".

Figure 3:
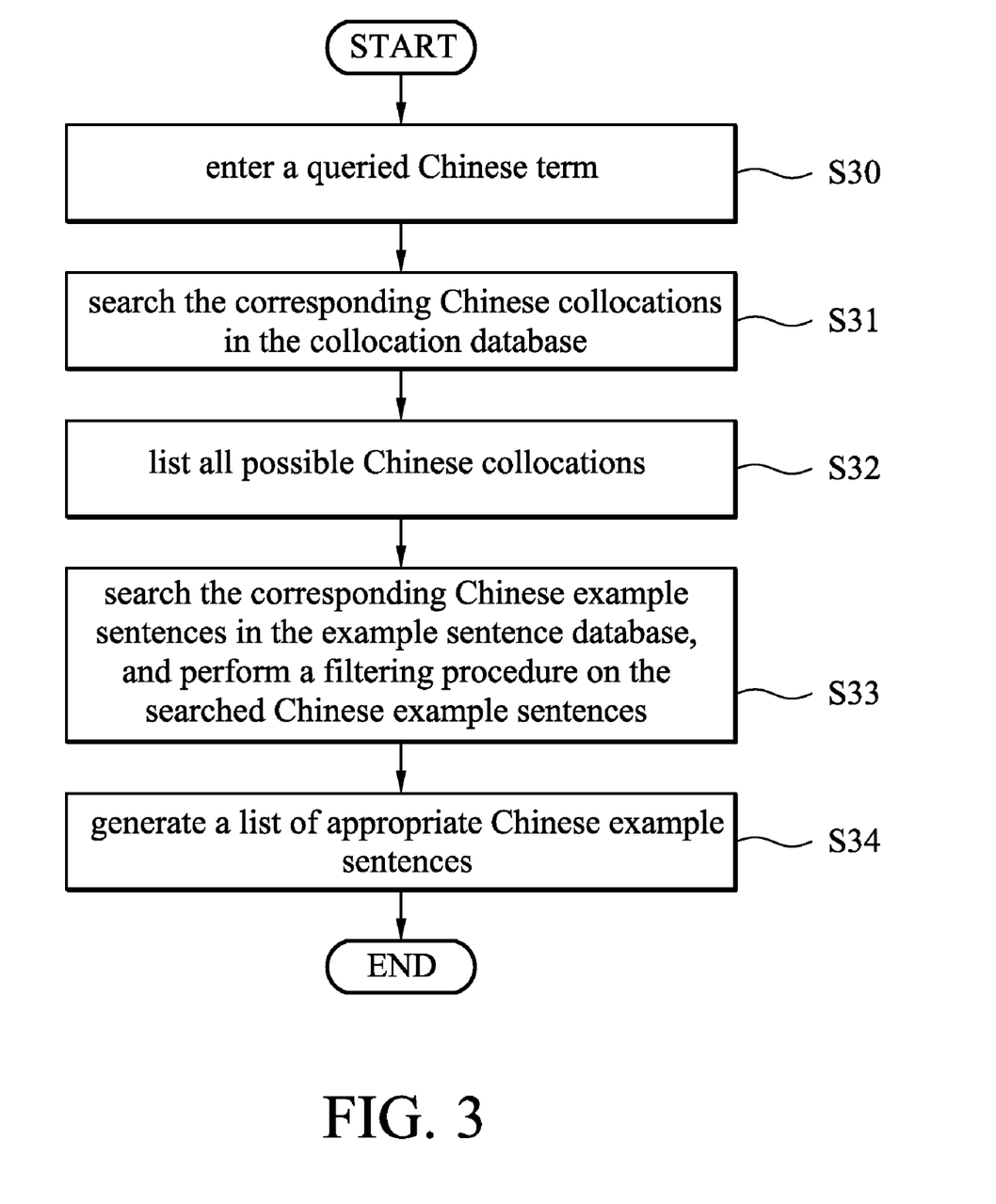
FIG. 3 depicts a querying operation flowchart of an apparatus for constructing a Chinese dictionary according to an embodiment of the invention.

FIG. 3 depicts a querying operation flowchart of an apparatus for constructing a Chinese dictionary according to an embodiment of the invention. First, a Chinese dictionary user enters a queried Chinese term (step S30). Next, the Chinese collocations corresponding to the queried Chinese term are searched in the Chinese collocation database 170 (step S31), and the possible Chinese collocations are listed for the Chinese dictionary user's reference (step S32). Next, the Chinese example sentences corresponding to the Chinese collocations are searched in the Chinese example sentence database 180, and a filtering procedure is performed on the searched Chinese example sentences (step S33). Finally, a list of appropriate Chinese example sentences is generated for the Chinese dictionary user's reference (step S34).

Note that in the step S33, the filtering procedure is performed according to the following two conditions:
  (1) The sentence lengths for each Chinese example sentence; and
  (2) The number of Chinese characters located between the queried Chinese term and the Chinese collocation for each Chinese example sentence.

For Condition (1), the sentence lengths for each Chinese example sentence that exceeds a threshold sentence length may be filtered out (discarded). For Condition (2), the Chinese example sentences having a number of Chinese characters located between the queried Chinese term and the Chinese collocation that exceeds a threshold number may also be filtered out (discarded). Note that Condition (1) and Condition (2) filters out the more complicated and complex Chinese example sentences.

Additionally, in the step S33, the filtering procedure may also include showing the number of times the queried Chinese term and the Chinese collocation both appear for each Chinese example sentence. Thus, showing the commonality between the queried Chinese term and the Chinese collocation.

In addition, the method for constructing a Chinese dictionary can be recorded as a program in a storage medium for performing the above procedures, such as an optical disk, floppy disk and portable hard drive and so on. It is to be emphasized that the program of the Chinese dictionary constructing method is formed by a plurality of program codes corresponding to the procedures described above.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for constructing a Chinese dictionary, comprising:
  determining a probability for nominalization of a Chinese term with a given collocation term according to a determination rule and the correlation between the Chinese term and its corresponding collocations, wherein the Chinese term comprises a verb part-of-speech and a noun part-of-speech, and the Chinese term is determined to be the verb part-of-speech,
  wherein the Chinese term and the given collocation term are within a Chinese sentence,
  wherein the given collocation term is a Chinese pre-term or a Chinese post-term corresponding to the Chinese term in the Chinese sentence;
  modifying the verb part-of-speech of the Chinese term with the given collocation term to the noun part-of-speech when the probability for nominalization of the Chinese term with the given collocation term is higher than a predetermined value; and
  storing the modified noun part-of-speech of the Chinese term associated with the given collocation term in a storage device.

2. The method for constructing a Chinese dictionary as claimed in claim 1, further comprising determining at least a Chinese collocation of the Chinese term according to the modified noun part-of-speech and the correlation between the Chinese term and its corresponding collocations.

3. The method for constructing a Chinese dictionary as claimed in claim 2, further comprising storing the Chinese collocation in a database.

4. The method for constructing a Chinese dictionary as claimed in claim 2, further comprising providing a plurality of Chinese sentences and determining the Chinese collocation according to the number of Chinese characters located between the Chinese term and the Chinese collocation in each of a plurality of Chinese sentences.

5. The method for constructing a Chinese dictionary as claimed in claim 4, further comprising determining the Chinese collocation according to the number of sentences among the Chinese sentences that contain both the Chinese term and the Chinese collocation.

6. The method for constructing a Chinese dictionary as claimed in claim 2, further comprising providing a plurality of Chinese sentences and determining the Chinese collocation according to the number of sentences among a plurality of Chinese sentences that comprise both the Chinese term and the Chinese collocation.

7. The method for constructing a Chinese dictionary as claimed in claim 1, wherein the part-of-speech for the Chinese pre-term and the Chinese post-term are respectively determined.

8. The method for constructing a Chinese dictionary as claimed in claim 7, further comprising determining the probability for nominalization according to the Chinese pre-term, the Chinese term, the Chinese post-term, the determined part-of-speech for the Chinese pre-term, the determined verb part-of-speech for the Chinese term and the determined part-of-speech for the Chinese post-term.

9. An apparatus for constructing a Chinese dictionary, comprising:
  a nominalization determination module, executed by a processor of the apparatus, determining a probability for nominalization of a Chinese term with a given collocation term according to a determination rule and the correlation between the Chinese term and its corresponding collocations, wherein the Chinese term comprises a verb part-of-speech and a noun part-of-speech, and the Chinese term is determined to be the verb part-of-speech,
  wherein the Chinese term and the given collocation term are within a Chinese sentence,
  wherein the given collocation term is a Chinese pre-term or a Chinese post-term corresponding to the Chinese term in the Chinese sentence; and a part-of-speech modification module, executed by the processor, modifying the verb part-of-speech of the Chinese term with the given collocation term to the noun part-of-speech when the probability for nominalization of the Chinese term with the given collocation term is higher than a predetermined value.

10. The apparatus for constructing a Chinese dictionary as claimed in claim 9, further comprising a collocation generation module, executed by the processor, determining at least a Chinese collocation of the Chinese term according to the modified noun part-of-speech and the correlation between the Chinese term and its corresponding collocations.

11. The apparatus for constructing a Chinese dictionary as claimed in claim 10, further comprising a database storing the Chinese collocation.

12. The apparatus for constructing a Chinese dictionary as claimed in claim 10, wherein the collocation generation module determines the Chinese collocation according to the number of Chinese characters located between the Chinese term and the Chinese collocation in each of a plurality of Chinese sentences.

13. The apparatus for constructing a Chinese dictionary as claimed in claim 12, wherein the collocation generation module determines the Chinese collocation according to the number of sentences among the plurality of Chinese sentences that comprise both the Chinese term and the Chinese collocation.

14. The apparatus for constructing a Chinese dictionary as claimed in claim 10, wherein the collocation generation module determines the Chinese collocation according to the number of sentences among a plurality of Chinese sentences that comprise both the Chinese term and the Chinese collocation.

15. The apparatus for constructing a Chinese dictionary as claimed in claim 9, wherein the part-of-speech of the Chinese pre-term and the Chinese post-term are respectively determined.

16. The apparatus for constructing a Chinese dictionary as claimed in claim 15, wherein the nominalization determination module determines the probability for nominalization according to the Chinese pre-term, the Chinese term, the Chinese post-term, the determined part-of-speech for the Chinese pre-term, the determined verb part-of-speech for the Chinese term and the determined part-of-speech for the Chinese post-term.

17. A non-transitory storage medium for storing a program for constructing a Chinese dictionary, wherein the program for constructing the Chinese dictionary comprises a plurality of program codes to be loaded onto a computer system so that a method for constructing the Chinese dictionary is executed by the computer system, and the method comprises:

determining a probability for nominalization of a Chinese term with a given collocation term according to a determination rule and the correlation between the Chinese term and its corresponding collocations, the Chinese term comprises a verb part-of-speech and a noun part-of-speech, and the Chinese term is determined to be the verb part-of-speech, wherein the Chinese term and the given collocation term are within a Chinese sentence, wherein the given collocation term is a Chinese pre-term or a Chinese post-term corresponding to the Chinese term in the Chinese sentence;

modifying the verb part-of-speech of the Chinese term with the given collocation term to the noun part-of-speech when the probability for nominalization of the Chinese term with the given collocation term is higher than a predetermined value; and storing the modified noun part-of-speech of the Chinese term associated with the given collocation term in a storage device.

18. The non-transitory storage medium as claimed in claim 17, wherein the method further comprises determining at least a Chinese collocation for the Chinese term according to the modified noun part-of-speech and the correlation between the Chinese term and its corresponding collocations.

19. The non-transitory storage medium as claimed in claim 18, wherein the method further comprises determining the Chinese collocation according to the number of Chinese characters located between the Chinese term and the Chinese collocation in each of a plurality of Chinese sentences.

20. The non-transitory storage medium as claimed in claim 18, wherein the method further comprises determining the Chinese collocation according to the number of sentences among a plurality of Chinese sentences that comprise both the Chinese term and the Chinese collocation.

* * * * *